United States Patent [19]

Hirose

[11] Patent Number: 5,548,568

[45] Date of Patent: Aug. 20, 1996

[54] OPTICAL-INFORMATION-RECORDING APPARATUS HAVING FINE AND ROUGH DRIVING CONTROL

[75] Inventor: Kenji Hirose, Narashino, Japan

[73] Assignee: Canon Kabushiki Kaisha, Tokyo, Japan

[21] Appl. No.: 393,021

[22] Filed: Feb. 23, 1995

Related U.S. Application Data

[63] Continuation of Ser. No. 718,375, Jun. 20, 1991, abandoned.

[30] Foreign Application Priority Data

Jun. 25, 1990 [JP] Japan .................................. 2-167645

[51] Int. Cl.⁶ ................... G11B 7/00; G02B 7/02
[52] U.S. Cl. .................. 369/44.14; 369/249; 359/824
[58] Field of Search .................... 369/44.14, 44.15, 369/44.16, 44.17, 44.21, 44.22, 255, 244, 249, 106; 359/813, 823, 824

[56] References Cited

U.S. PATENT DOCUMENTS

| | | | |
|---|---|---|---|
| 4,449,213 | 5/1984 | Noborimoto et al. | 369/44.16 |
| 4,819,109 | 4/1989 | Okada et al. | 360/106 |
| 4,937,510 | 6/1990 | Konno et al. | 360/78.07 |
| 4,942,562 | 7/1990 | Suzuki | 369/44.21 |
| 4,985,882 | 1/1991 | Tanaka et al. | 369/44.34 |
| 5,018,033 | 5/1991 | Miyazaki et al. | 360/106 |
| 5,063,548 | 11/1991 | Yamashita et al. | 369/44.15 |
| 5,097,456 | 3/1992 | Tanoshima et al. | 369/44.15 |
| 5,101,398 | 3/1992 | Inoue et al. | 369/255 |
| 5,150,343 | 9/1992 | Goto et al. | 369/44.17 |
| 5,157,642 | 10/1992 | Tsukamura et al. | 369/32 |
| 5,187,702 | 2/1993 | Takahashi | 369/44.15 |
| 5,189,659 | 2/1993 | Ohta | 369/44.34 |
| 5,218,587 | 6/1993 | Nomiyama et al. | 369/44.16 |

FOREIGN PATENT DOCUMENTS

| | | |
|---|---|---|
| 0149888 | 7/1985 | European Pat. Off. . |
| 0350225 | 1/1990 | European Pat. Off. . |
| 0405604 | 1/1991 | European Pat. Off. . |

OTHER PUBLICATIONS

Artken et al, University Physics, 1984 pp. 671–672.

*Primary Examiner*—Georgia Y. Epps
*Assistant Examiner*—Nabil Hindi
*Attorney, Agent, or Firm*—Fitzpatrick, Cella, Harper & Scinto

[57] ABSTRACT

An information recording-reproducing apparatus for optically effecting the recording and/or reproduction of information on a disk-like recording medium having a plurality of tracks thereon includes an optical head for applying a light beam for effecting the recording and/or reproduction of the information to a desired track on the medium, a guide for guiding the optical head radially of the medium to have access to the desired track on the medium, and a yoke and a permanent magnet fixed to the apparatus and a first linear motor coil for the rough driving and a second linear motor coil for the precise driving provided on the optical head to generate a driving force for moving the optical head along the guide.

3 Claims, 6 Drawing Sheets

OPTICAL-INFORMATION-RECORDING APPARATUS HAVING FINE AND ROUGH DRIVING CONTROL

This application is a continuation of application Ser. No. 07/718,375 filed Jun. 20, 1991, now abandoned.

BACKGROUND OF THE INVENTION

1. Field of the Invention

This invention relates to an optical information recording-reproducing apparatus (hereinafter referred to as the optical disk apparatus) for effecting the recording and/or reproduction of information on a recording medium by the use of an optical head, and particularly to the structure of the optical head.

2. Related Background Art

Figure 1:
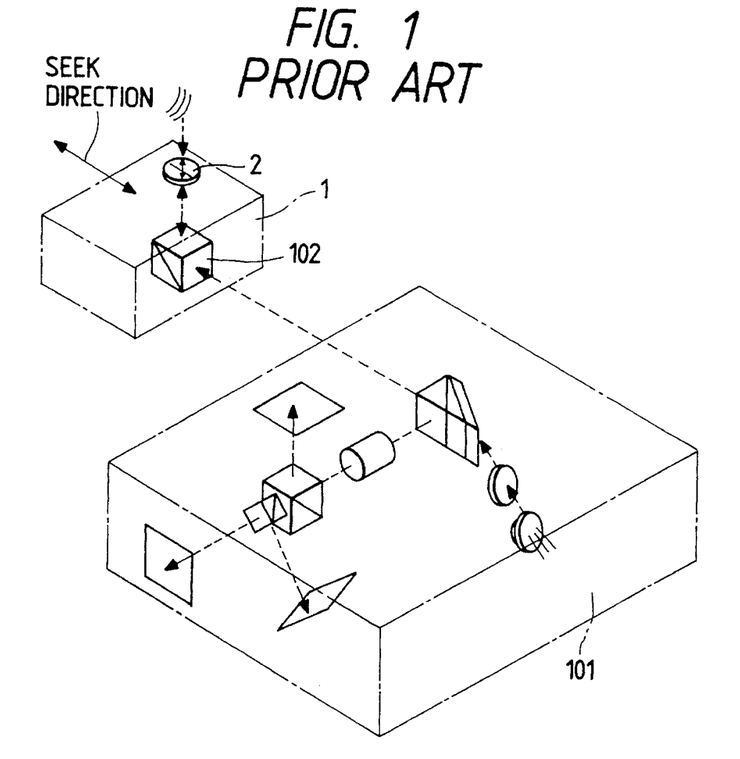
FIG. 1 shows the construction of an optical head according to the prior art.

An optical head in a prior-art optical disk apparatus is constructed as shown, for example, in FIG. 1 of the accompanying drawings.

In FIG. 1, the reference numeral 101 designates a fixed optical head fixed to an apparatus base for effecting the oscillation of a laser beam and the reproducing process of reflected light, the reference numeral 1 denotes a movable optical head for condensing and applying the laser beam from the fixed optical head onto a recording medium for the recording and/or reproduction of information and movable in the radial direction of a disk (the direction of arrow indicated in the figure), the reference numeral 2 designates an objective lens for condensing the laser beam on the surface of the recording medium, and the reference numeral 102 denotes a bending mirror for bending the laser beam emitted in parallel to the seek direction of the movable optical head from the fixed optical head in a direction perpendicular to the surface of the medium.

Figure 2:
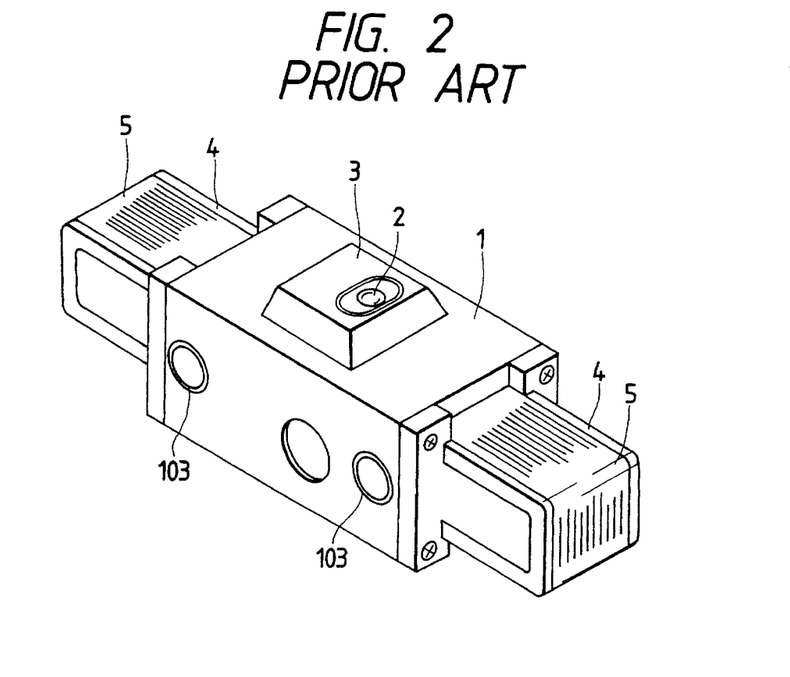
FIG. 2 shows the construction of a movable optical head according to the prior art.
Figure 3:
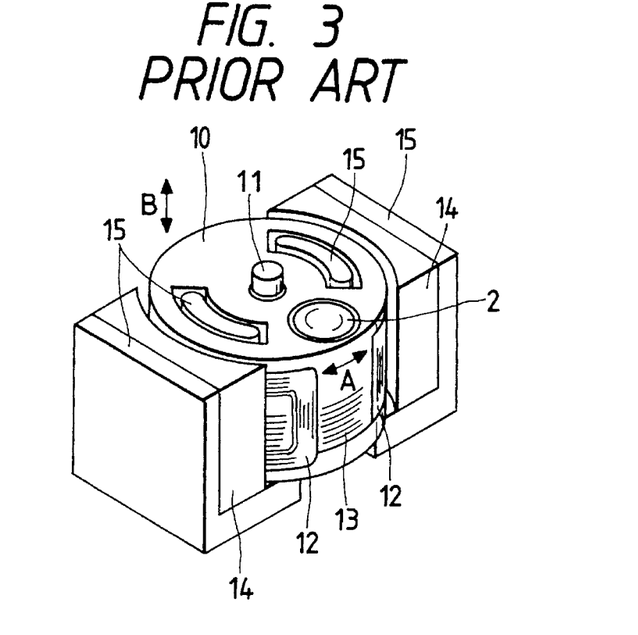
FIG. 3 shows the details of an actuator for the prior-art movable optical head shown in FIG. 2.

FIG. 2 of the accompanying drawings shows the details of the movable optical head shown in FIG. 1. In FIG. 2, reference numerals identical to those in FIG. 1 designate identical portions. Also, in FIG. 2, the reference numeral 3 denotes an actuator for driving the objective lens in the focusing and tracking directions of the recording medium, the reference numeral 5 designates a linear motor coil cooperating with a permanent magnet and a yoke, not shown (fixed to the apparatus side) to drive the movable optical head, and the reference numeral 103 denotes a bearing for receiving the guide, not shown, of the movable optical head. FIG. 3 of the accompanying drawings shows the details of the actuator shown in FIG. 2. In FIG. 3, the reference numeral 2 designates the objective lens, the reference numeral 10 denotes an objective lens holder, the reference numeral 11 designates a pin fixed to an optical head base, the reference numeral 12 denotes a tracking coil mounted on the objective lens holder 10, the reference numeral 13 designates a focusing coil, the reference numeral 14 denotes a permanent magnet, and the reference numeral 15 designates a yoke. In the above-described construction, by an electric current being supplied to the tracking coil 12, the objective lens holder 10 is rotated in the direction of arrow A about the pin 11. Thereby, the tracking of the laser beam is effected. Also, by an electric current being supplied to the focusing coil 13, the objective lens holder 10 is slid in the axial direction of the pin 11, i.e., the direction of arrow B, whereby the focusing of the laser beam is effected.

The seek operation of the optical head will now be described on the basis of the above-described construction. The entire movable optical head is first moved to near a desired position on the recording medium by a linear motor. At this time, the movable optical head is moved by the linear motor until a desired track falls within the movable range of the actuator in the direction of tracks by the number of transverse tracks and position detecting means such as an encoder. The desired track is then finely sought by the actuator, and when the laser spot arrives at the desired track, the laser spot is controlled to follow that track (tracking and focusing control), thus terminating the seek operation.

Now, to make the optical disk apparatus versatile in place of the present-day magnetic disk in the future, it is a requisite task to make the seek operation time of the above-described optical head as short as the seek operation time of the magnetic head.

For the realization of such speedup of the seek operation, it is requisite to make the movable optical head compact and light in weight, but the movable optical head of the above-described conventional construction carries thereon a complicated and large tracking and focusing actuator as shown in FIG. 3 and therefore, has structural limitations in the realization of its compactness and light weight, and this has led to the problem that the required speedup of the seek operation cannot be achieved.

SUMMARY OF THE INVENTION

The present invention has been made in view of the above-noted problem and the object thereof is to provide a movable optical head of novel construction which can realize the speedup of the seek operation as compared with the prior art apparatus.

The above object is achieved by an optical information recording-reproducing apparatus for optically effecting the recording and/or reproduction of information on a disk-like recording medium which has an optical head for applying a light beam for effecting the recording and/or reproduction of said information to a desired track on said medium, a guide for guiding said optical head radially of said medium to have access to the desired track on said medium, a yoke and a permanent magnet fixed to said apparatus to generate a driving force for moving said optical head along said guide, a first linear motor coil for the rough driving and a second linear motor coil for the precise driving provided on said optical head.

DETAILED DESCRIPTION OF THE PREFERRED EMBODIMENTS

Figure 4:
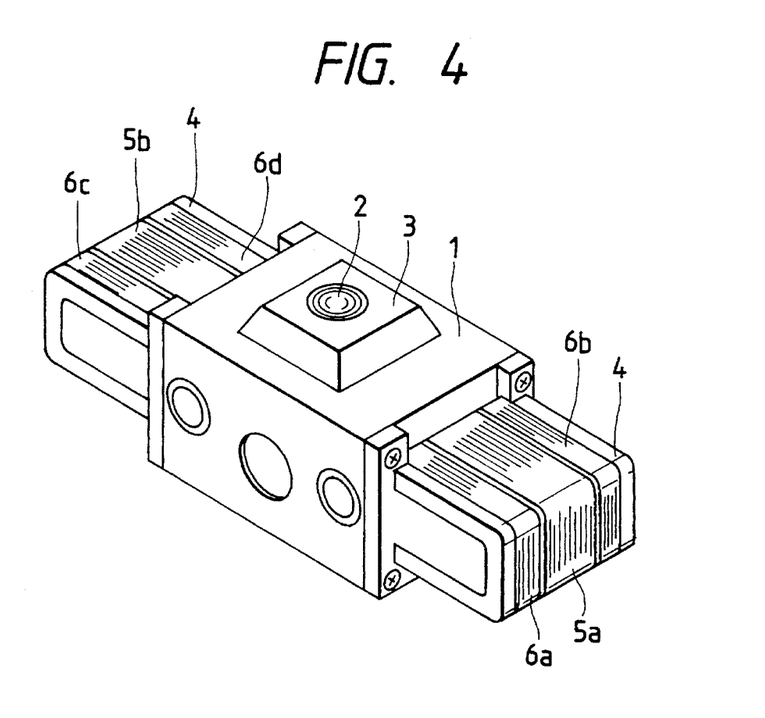
FIG. 4 shows the details of the movable optical head of the present invention.

FIG. 4 shows an embodiment of the movable optical head of the present invention. In FIG. 4, the reference numeral 1 designates a movable optical head body, the reference numeral 2 denotes an objective lens for condensing a laser beam on the surface of a recording medium, the reference numeral 3 designates an actuator for driving the objective lens only in a focus direction, the reference numeral 4 denotes a bobbin mounted on the movable optical head body 1, the reference characters 5a and 5b designate linear motor coils for the rough driving of the movable optical head which are connected together and wound around the bobbin, and the reference characters 6a, 6b, 6c and 6d denote linear motor coils for the precise driving of the movable optical head which are connected together and wound around the bobbin.

As can be seen from FIG. 4, the linear motor coils for the rough driving are wound about the central portion of the outer periphery of the bobbin and the linear motor coils for the precise seek are wound on the opposite end portions of the outer periphery of the bobbin so as to surround the linear motor coils for the rough driving, thereby adjusting the weight balance of the entire optical head. Also, the linear motor coils for the rough driving need be of a high output specification for generating a high thrust in order to shorten the seek time. Therefore, these coils are small in resistance value and great in the number of turns, but are great in inductance.

The linear motor coils for the precise driving give priority to quick responsiveness than to thrust because the tracking operation heretofore effected by an actuator is effected by a linear motor. Therefore, the linear motor coils for the precise driving are set so as to be great in resistance and small in the number of turns (greater in resistance and smaller in the number of turns than at least the linear motor coils for the rough driving) and small in inductance (smaller in inductance than at least the linear motor coils for the rough driving).

Figure 5A:
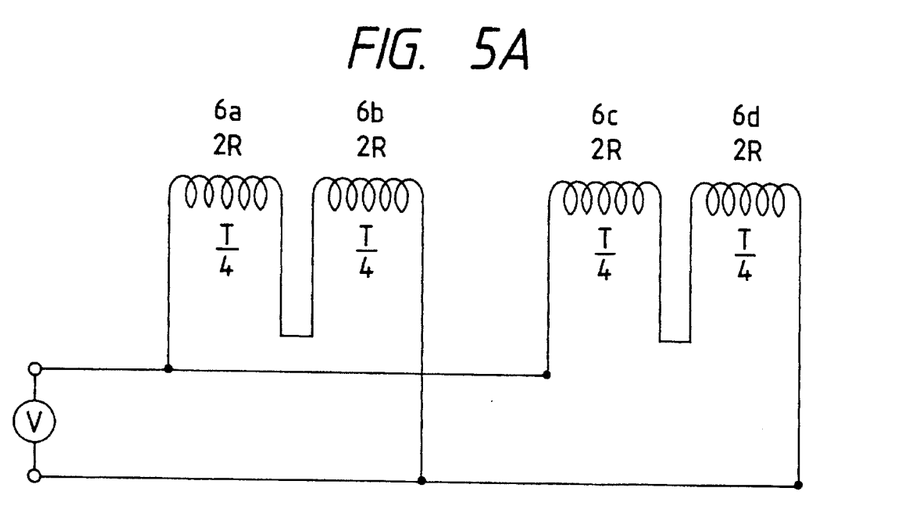
FIGS. 5A and 5B show the connected state of linear motor coils in the movable optical head shown in FIG. 4.
Figure 5B:
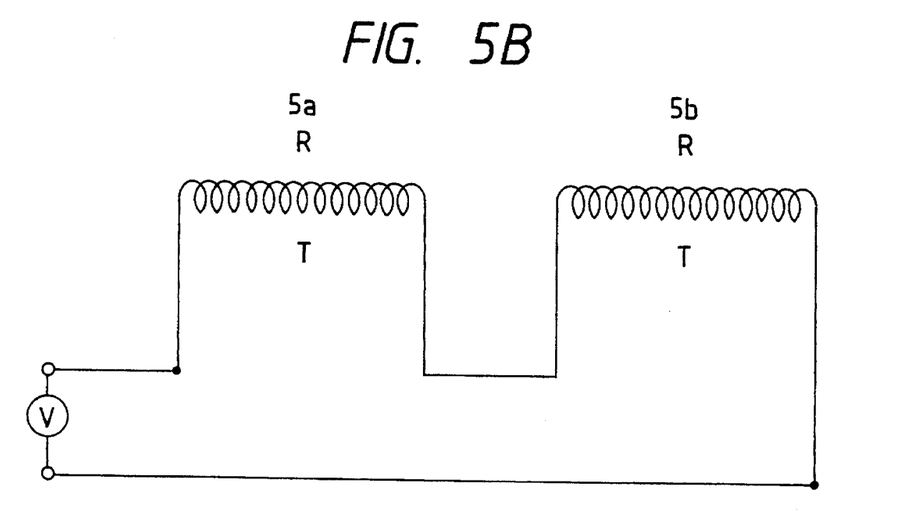

FIGS. 5A and 5B show methods of connecting the linear motor coils shown in FIG. 4. FIG. 5A shows a method of connecting the linear motor coils for the precise driving, and FIG. 5B shows a method of connecting the linear motor coils for the rough driving. In these figures, R represents the resistance values of the coils, and T represents the numbers of turns of the coils.

As shown, in the coils for the precise driving, the coils great in resistance value and small in the number of turns are parallel-connected, and in the coils for the rough driving, the coils small in resistance value and great in the number of turns are series-connected. All these coils are the same in the resistance value of the whole, but differ in the rising of electric current from one another as shown by the following equation:

$$I = \frac{V}{R}(1 - e^{-\frac{R}{L}t})$$

Figure 6:
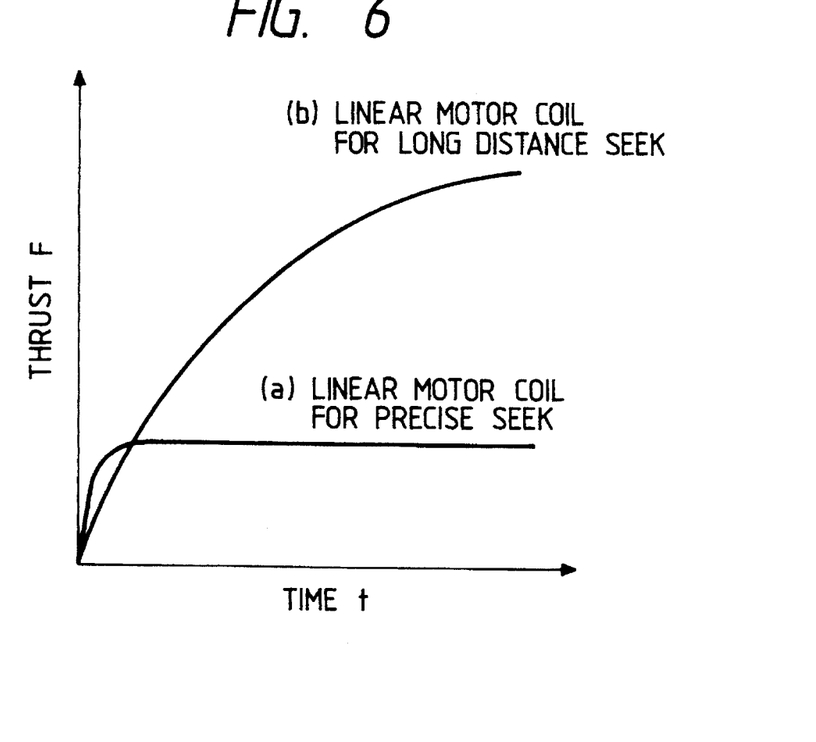
FIG. 6 is graph showing the characteristics of a rough linear motor coil and a precise linear motor coil in the movable optical head shown in FIG. 4.

The inductance L increases in proportion to an increase in the number of turns of the coil. Also, since the thrust of the linear motor is proportional to the electric current x the number of turns, the rising characteristics of the two coils are as shown in FIG. 6. In FIG. 6, (a) shows the rising characteristic of the linear motor coils for the precise driving, and (b) shows the rising characteristic of the linear motor coils for the rough driving.

Thus, it will be seen that in the case of the linear motor coils for the precise driving, the final thrust is ¼ of that of the linear motor coils for the rough driving, but the former coils are quick in the rising of the thrust and excellent in rapid responsiveness.

Figure 9:
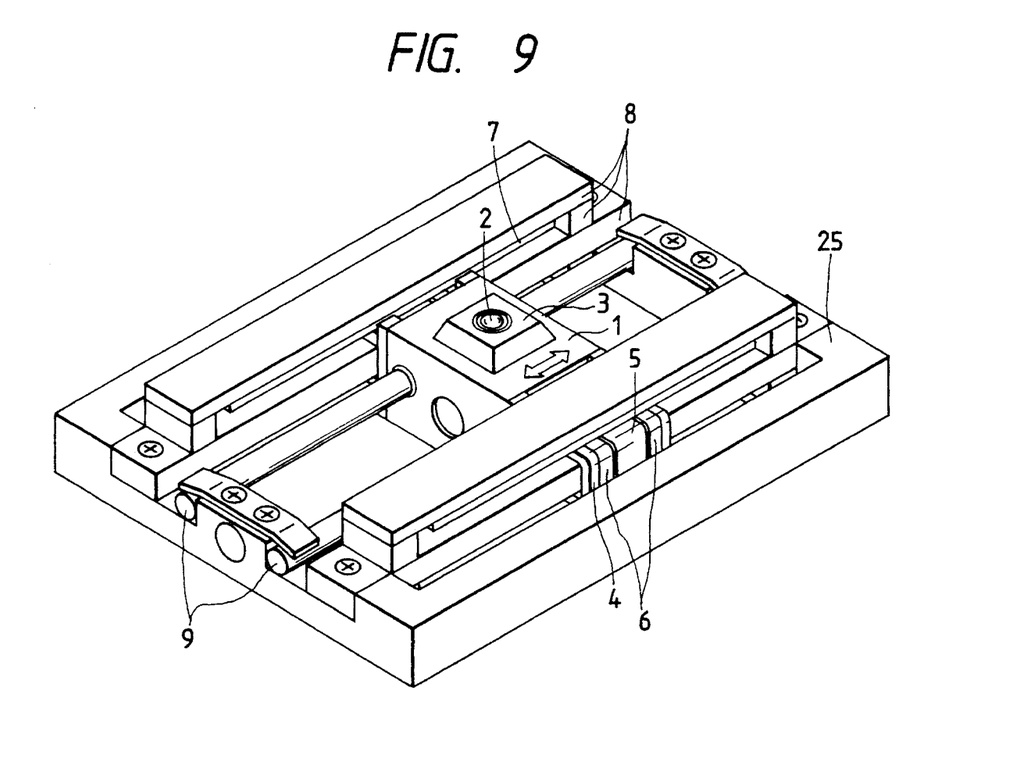
FIG. 9 shows a construction in which the movable optical head shown in FIG. 4 is incorporated into a guide mechanism fixed to the apparatus side.

FIG. 9 shows a construction in which the optical head shown in FIG. 4 is incorporated into a guide mechanism on the apparatus side. The same reference numerals as those in FIG. 4 designate the same members. The reference numeral 7 denotes a magnet, the reference numeral 8 designate yokes, the reference numeral 9 denotes guide rails for guiding the movable optical head radially of the medium, and the reference numeral 25 designates a base bed fixed to the apparatus side for supporting them.

When in the above-described construction, the linear motor coils of the optical head are electrically energized, the linear motor coils 5 or 6 cooperate with the magnet 7 and yokes 8 to generate a driving force in the direction of arrow and the optical head is moved along the guide rails 9.

Figure 10:
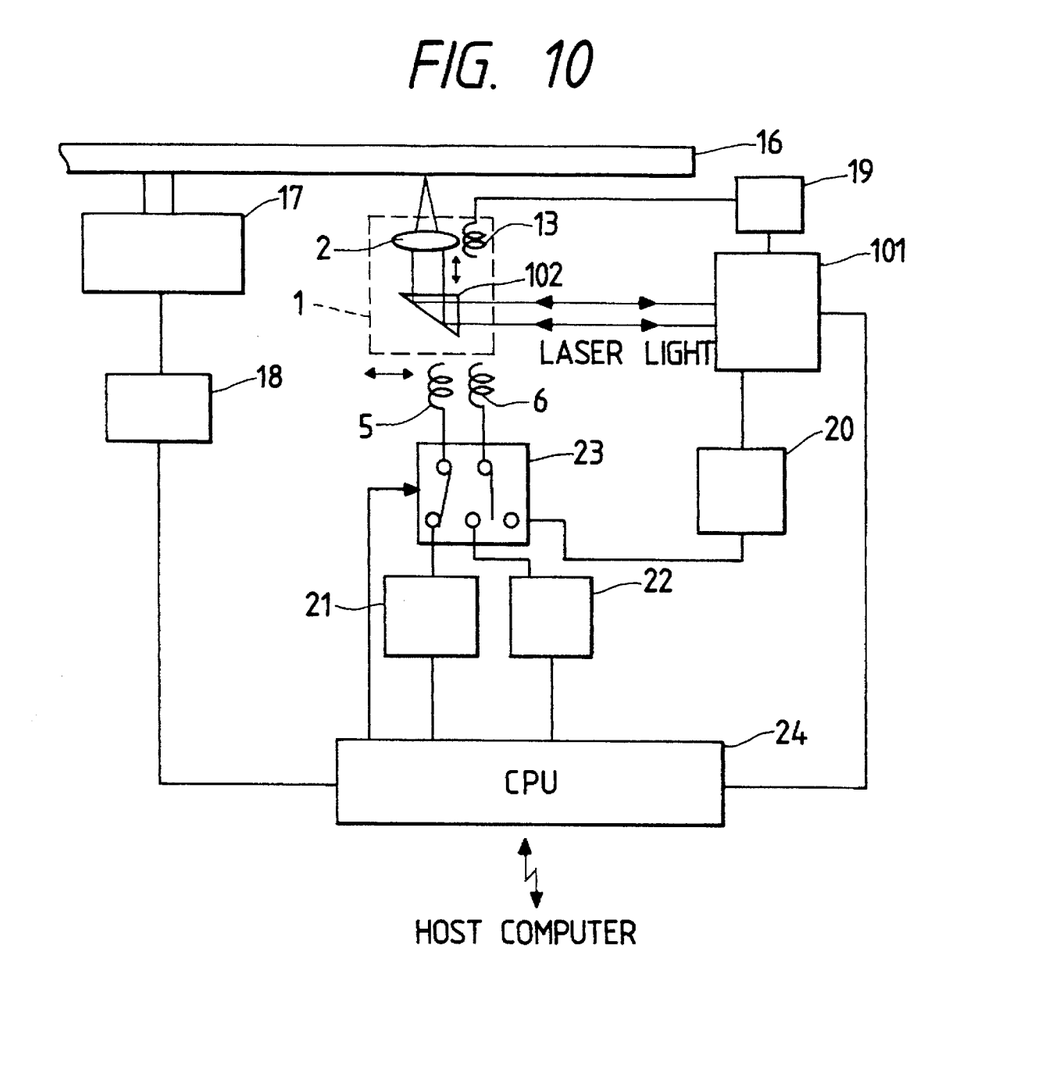
FIG. 10 is a block diagram showing a construction in which the movable optical head of the present invention is incorporated into an optical information recording-reproducing apparatus.

The operation of the optical disk apparatus carrying the optical head of the present embodiment thereon will now be described with reference to the block diagram of FIG. 10. In FIG. 10, the same reference numerals as those in FIG. 9 designate the same members. The reference numeral 16 denotes a disk-like recording medium (hereinafter referred to as the disk), the reference numeral 17 designates a spindle motor for rotating the disk, the reference numeral 18 denotes a spindle motor control circuit for controlling the spindle motor 17, the reference numeral 19 designates a focusing servo for controlling the driving of the objective lens 2 in the focusing direction on the basis of a focusing error signal detected by the fixed optical head 101, the reference numeral 20 denotes a tracking servo for effecting the tracking control of the movable optical head 1 in the tracking direction on the basis of a tracking signal detected by the fixed optical head 101, the reference numeral 21 designates a rough driving driver for controlling the rough driving of the movable optical head 1 in the radial direction of the disk, the reference numeral 22 denotes a precise driving driver for controlling the precise driving of the movable optical head 1 in the radial direction of the disk, the reference numeral 23 designates a switch for controlling the connected state of the rough driving driver and the linear motor coils 5 for the rough driving and the connected state of the linear motor coils 6 for the precise driving and the tracking servo or the rough driving driver, and the reference numeral 24 denotes a CPU connected to an outside host computer for controlling the spindle servo 18, the fixed optical head 101, the rough driving driver 21, the switch 22, etc.

The operation of the above-described construction will now be described. When a seek starting command is first input from the host computer to the CPU 24, the distance between the track being followed by a light beam spot and a desired track (the difference in the number of tracks) is indexed in the CPU 24, and in conformity therewith, whether seek should be effected by the use of the linear motor for the rough driving or by the use of the linear motor for the precise driving is judged and a speed profile conforming to the distance is made. When seek is to be effected by the use of the linear motor for the rough driving, the CPU 24 controls the switch 23 to connect the rough driving driver 21 to only the linear motor coils 5 for the rough driving and start the movement of the movable optical head in accordance with the aforementioned speed profile. When the light beam arrives at the desired track, the CPU 24 controls the switch 23 so that the light beam spot may follow the desired track, and brings the rough driving driver 21 and the linear motor coils 5 for the rough driving into their non-connected state, and newly brings only the tracking servo 20 and linear motor coils 6 for the precise driving into their connected state. Then, the precise driving of the movable optical head, i.e., tracking control, is effected on the basis of a tracking error signal detected by the fixed optical head 101. When the linear motor for the precise driving is selected, the CPU 24 controls the switch 23 to bring only the precise driving driver and linear motor coils 6 for the precise driving into their connected state. Then, the CPU 24 starts the movement of the movable optical head in accordance with the speed profile, and when the light beam spot arrives at the desired track, the CPU 24 controls the switch 23 to bring only the tracking servo 20 and linear motor coils 6 for the precise driving into their connected state, and effects the tracking control of the movable optical head so that the light beam spot may follow the desired track.

While the above mentioned has been described with respect to a so-called separate type optical head comprising a fixed optical head and a movable optical head, the present invention is not restricted to such a form, but of course is also effectively applicable to a unitary type optical head in which a light source and a light receiving sensor are movable together.

Figure 7:
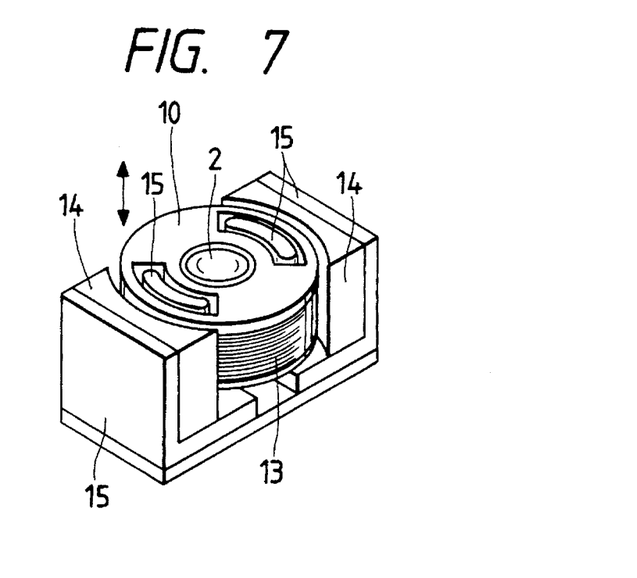
FIG. 7 shows the details of the actuator portion of the movable optical head shown in FIG. 4.
Figure 8:
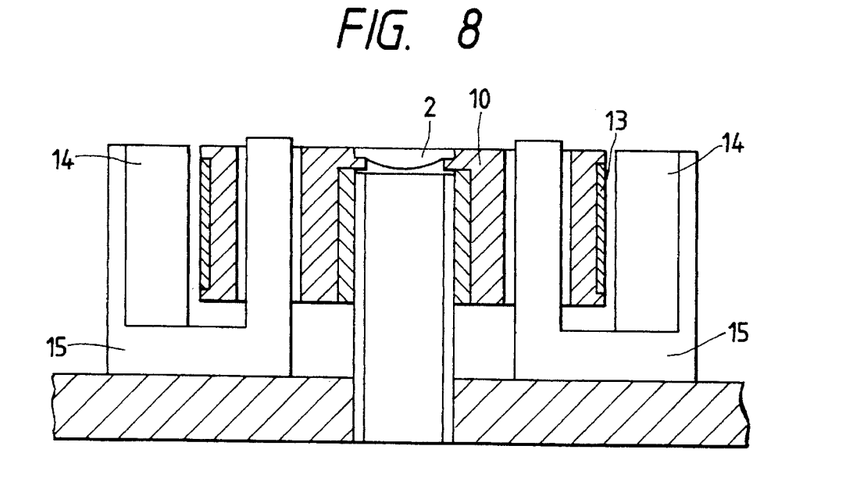
FIG. 8 is a cross-sectional view of the actuator of FIG. 7.

As described above, by using plural pairs of linear motor coils in the movable optical head, the rough driving and precise driving of the light beam spot can be accomplished by only the linear motors and the operation of the objective lens actuator in the tracking direction becomes unnecessary and therefore, as shown in FIGS. 7 and 8, the objective lens actuator can be made compact and light in weight and further, the entire optical head can be made compact and light in weight.

What is claimed is:

1. An optical information recording and/or reproducing apparatus for effecting recording of information on and/or reproduction of information from a disk-like recording medium having a plurality of tracks thereon by using a laser light, including:

an objective lens for irradiating the recording medium with a laser light;

a holder for holding said objective lens;

a focusing coil which is the exclusive coil secured to said holder;

a carriage for movably supporting said holder such that said holder is movable in a focusing direction, relative to said carriage;

guide means for guiding the carriage radially of the recording medium;

a yoke and a permanent magnet being provided along said guide means and fixed to said apparatus, said permanent magnet being arranged to be apart from said yoke by a predetermined gap and fixed to said apparatus;

a seek coil and a tracking coil which are fixed to said carriage, respectively, to be incapable of moving relative to said carriage and a part of each of which is positioned within said predetermined gap, said seek coil and said tracking coil generating a drive force for moving said carriage in a direction along said guide means by cooperating with a magnetic field generated in said predetermined gap, an inductance of said tracking coil being smaller than that of said seek coil;

first current applying means for applying a current to said seek coil so as to access the laser light to a desired track on the recording medium; and second current applying means for applying a current to said tracking coil so as to follow the laser light to said desired track on the recording medium.

2. An apparatus according to claim 1, wherein the number of turns of said tracking coil is smaller than that of said seek coil.

3. An apparatus according to claim 1 further comprising focus magnetic field generating means, fixed to said carriage, for applying a magnetic field to said focusing coil.

* * * * *

UNITED STATES PATENT AND TRADEMARK OFFICE
CERTIFICATE OF CORRECTION

PATENT NO. : 5,548,568
DATED : August 20, 1996
INVENTOR(S) : KENJI HIROSE

It is certified that error appears in the above-identified patent and that said Letters Patent is hereby corrected as shown below:

ON COVER PAGE

AT [54] TITLE

"OPTICAL-INFORMATION-RECORDING" should read --OPTICAL-INFORMATION RECORDING-REPRODUCING--.

AT [56] REFERENCES CITED

"Artken et al." should read --Arfken et al.--.

COLUMN 1

Line 1, "OPTICAL-INFORMATION-RECORDING" should read --OPTICAL-INFORMATION RECORDING-REPPODUCING--.

COLUMN 3

Line 30, "need" should read --need to--.

Lines 61-64, " $I = \frac{V}{R}(1 - e^{-\frac{R}{L}t})$ "

should read -- $I = \frac{V}{R}(1 - e^{-\frac{R}{L}t})$ (V: voltage, R: resistance, L: inductance, t: time)  --.

UNITED STATES PATENT AND TRADEMARK OFFICE
CERTIFICATE OF CORRECTION

PATENT NO. : 5,548,568
DATED : August 20, 1996
INVENTOR(S) : KENJI HIROSE

It is certified that error appears in the above-identified patent and that said Letters Patent is hereby corrected as shown below:

COLUMN 6

Line 38, "claim 1" should read --claim 1,--.

Signed and Sealed this

Twenty-first Day of January, 1997

Attest:

BRUCE LEHMAN

Attesting Officer

Commissioner of Patents and Trademarks